United States Patent
Kodera

(10) Patent No.: US 8,749,812 B2
(45) Date of Patent: Jun. 10, 2014

(54) VARIABLE DATA PRINTING METHOD UTILIZING SEPARATE PRINTERS FOR DIFFERENT CONTENT

(75) Inventor: Tetsuhiro Kodera, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 855 days.

(21) Appl. No.: 12/239,057

(22) Filed: Sep. 26, 2008

(65) Prior Publication Data

US 2010/0079787 A1    Apr. 1, 2010

(51) Int. Cl.
*G06F 3/12* (2006.01)
*H04N 1/00* (2006.01)

(52) U.S. Cl.
USPC ........................................... 358/1.15; 358/1.6

(58) Field of Classification Search
USPC ........................................................ 358/1.15
See application file for complete search history.

(56) References Cited

U.S. PATENT DOCUMENTS

2007/0229883 A1* 10/2007 Fujimori et al. ............. 358/1.15
2008/0174810 A1*  7/2008 Kim et al. .................... 358/1.15
2008/0225332 A1*  9/2008 Saito ............................ 358/1.15

FOREIGN PATENT DOCUMENTS

| JP | 2003-237167 | 8/2003 |
|---|---|---|
| JP | 2003-260844 | 9/2003 |
| JP | 2003-323289 | 11/2003 |
| JP | 2005-309561 | 11/2005 |
| JP | 2008-65526 | 3/2008 |

OTHER PUBLICATIONS

Japanese Office Action, dated Nov. 6, 2012 in a counterpart Japanese patent application, No. 2009-155635.
Japanese Office Action, dated Mar. 26, 2013, in a counterpart Japanese patent application, No. JP 2009-155635.

* cited by examiner

*Primary Examiner* — Marivelisse Santiago Cordero
*Assistant Examiner* — Mesfin Getaneh
(74) *Attorney, Agent, or Firm* — Chen Yoshimura LLP

(57) ABSTRACT

A variable data printing (VDP) method is disclosed in which different types of contents on each piece of the VDP production, such as color form contents and black and white contents, are printed using different types of printers, such as color printers and black and white printers, respectively. The color form content is printed first to form partially printed sheets. Partially printed sheet carrying different color contents are loaded into different input trays of the black and white printers. The black and white content is printed on the partially printed sheets using the black and white printers. When printing the black and white content, the color data in the input VDP data is excluded. The job tickets for the black and white print jobs specify the input trays to be used so that the appropriate partially printed sheet is selected for each black and white print job.

14 Claims, 4 Drawing Sheets

VARIABLE DATA PRINTING METHOD UTILIZING SEPARATE PRINTERS FOR DIFFERENT CONTENT

BACKGROUND OF THE INVENTION

1. Field of the Invention

This invention relates to a variable data printing method, and in particular, it relates to a variable data printing method that prints variable content and form content separately or prints color content and black and white content separately using different printers.

2. Description of Related Art

Variable data printing (VDP) is a form of printing multiple pieces (often large numbers of pieces) where each piece contains a combination of form content (common to all of the pieces or a large subset of the pieces) and variable content (different for each piece, such as name and address). VDP are widely used to print personalized letters, direct marketing materials, billing statements, etc. Typically, a database or external file is used to provide the information for the variable content. Form content is also provided as external files or a database. For example, the variable data and form data may be provided in a PDF file.

SUMMARY

The present invention is directed to an improved variable data printing method.

An object of the present invention is to provide a convenient way for the print shop manager use different types of printers to print different types of content.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a variable data printing method implemented in a print shop management apparatus, which includes: (a) receiving input data including variable data and form data, the variable data including a plurality of entries each having a plurality of attributes, the input data further including association rules specifying an association between the variable data attributes and the form data; (b) receiving input tray selection rules which specify an association between input trays of one or more first printers and either the form data or one or more attributes of the variable data entries; (c) generate print data for the plurality of print jobs, wherein the print data is generated by excluding a first type of form data in the input data and each print job includes an input tray parameter which is set based on the input tray selection rules; and (d) submitting the print jobs including the print data and the input tray parameters to the one or more first printers.

In another aspect, the present invention provides a variable data printing method implemented in a print shop management apparatus for managing a plurality of printers, the plurality of printers including one or more first printers and one or more second printers, which includes: (a) receiving input data including variable data and form data, the variable data including a plurality of entries each having a plurality of attributes, the input data further including association rules specifying an association between the variable data attributes and the form data; (b) receiving content division rules which divides the variable data and form data into a first type of data and a second type of data; (c) printing the first type of data using one or more first printers to generate a plurality of partially printed sheets; (d) receiving input tray selection rules which specify an association between input trays of the one or more second printers and either form data or attributes of the variable data entries, each input tray having been loaded with a plurality of the partially printed sheets; (e) generate print data for the plurality of print jobs from the second type of data while excluding the first type of data, wherein each print job includes an input tray parameter which is set based on the input tray selection rules; and (f) submitting the print jobs including the print data and the input tray parameters to the second printers for printing.

In another aspect, the present invention provides a computer program product that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
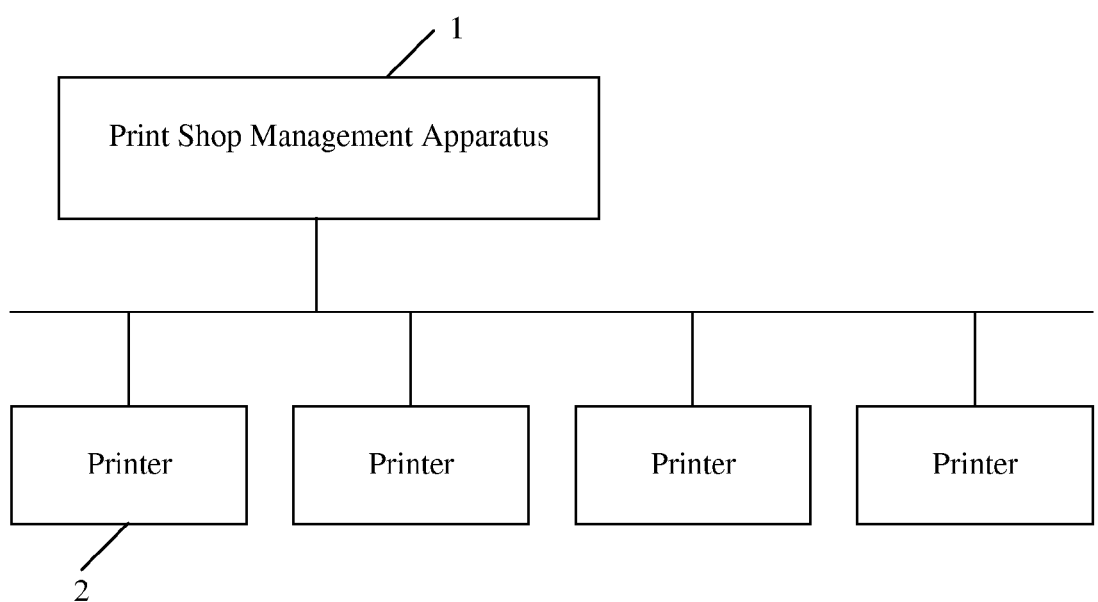
FIG. 1 is a schematic diagram illustrating a print shop system in which embodiments of the present invention are implemented.

Variable data printing (VDP) is often performed at professional print shops or in-house print/copy departments, where multiple printers are employed to processes large numbers of print jobs. Such an environment is collectively referred to as a "print shop" in this disclosure. As schematically shown in FIG. 1, a print shop typically includes a print shop management apparatus 1 (e.g. a server computer) and a plurality of printers 2 connected to each other by a data communication line or network such as an LAN (Local Area Network). The print shop often employs other devices such as finishing devices (not shown in FIG. 1), which may be on-line or off-line. The VDP method described herein is implemented by the print shop management system software, which is stored in a storage device (e.g., a hard disk drive) of the server 1 and is executed by the server.

The following descriptions use a direct marketing campaign as an example, but the method can be used in may other applications. To produce a VDP production, input data is provided that includes variable data and form data. Variable data, which may be provided in the form of a database, includes a plurality of entries each associated with an individual as a target of the marketing campaign. Each entry in the variable data includes a plurality of attributes such as the individual's name and address, demographic information, relevant behavioral history, other specific information, etc. Not all variable data are printed. The form data includes contents to be printed, and may be text, graphics, images, etc. A selected combination of contents will be printed on each piece. The input data also includes a set of association rules that define the associations between variable data attributes and form data. For example, the rules may specify what combination of form data contents is to be printed for each individual based on his age. Such rules are typically pre-defined by the creator of the marketing campaign based on market research and models. When performing VDP printing, the appropriate form data is selected for each entry based on it attributes, and combined with variable data (e.g. the name and address) to generate each printed piece.

Typically, the form content printed on each piece is selected from a limited number of form contents such as images, graphics, etc. For example, each piece may contain a color image depicting a product, black and white text describing the depicted product, and a graphic representing a map for a store location. The product image and descriptive text may be selected from a set of product images/text based on the individual's age, and the map may be selected from a set of maps based on the individual's address. In a conventional VDP method, the entire pieces, including both form content and variable content, are printed using a laser printer as a single step. Thus, although some form content is common to a large number of printed pieces, it is printed on each piece together with the variable content using laser printers. In addition, if the form content includes color images or graphics, the conventional method uses a color laser printer to print the entire piece including the variable content which is typically black and white. Color printing is more costly and slower than black and white printing; laser printing is more costly and slower than offset printing.

Embodiments of the present invention provide a VDP method which allows different types of contents to be printed separately. In one embodiment, color form content is printed first using color printers or offset printing to generate partially printed sheets, and black and white content (including both variable content and form content) is printed on the partially printed sheets using black and white laser printers. In another embodiment, form content (both color and black and white) is printed first using offset printing, and variable content is printed using laser printing.

Figure 2:
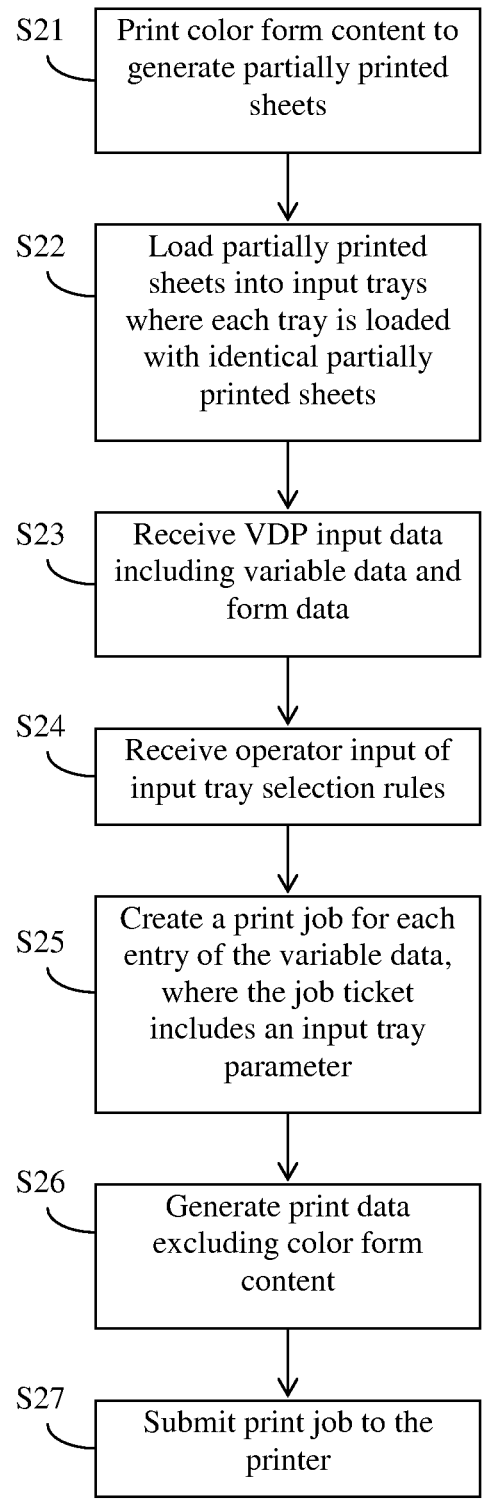
FIG. 2 illustrates a variable data printing method according to an embodiment of the present invention.

FIG. 2 illustrates a VDP printing process according to a first embodiment of the present invention, where color content is printed separately from black and white content. First, a first pass printing step is performed to print color form contents to generate partially printed sheets (step S21). This step may be done by offset printing or laser printing, and the printer(s) used for this step may be managed by the same print shop management server or a different server. The VDP input data is loaded onto the server. As mentioned above, each piece of the VDP production will include form contents selected from a number of different contents based on the association rules. The total number of sheets that will contain a particular color form content can be obtained by analyzing the variable data entries. Thus, in the first pass printing step, the server analyzes the variable data entries to determine the number of sheets containing each color content, extracts the color content from the VDP data, determines the location of the color content on the sheets (i.e. the location where they should appear in the final printed pieces), and prints the color contents to form partially printer sheets.

It should be noted that color contents may contain black component that is to be reproduced by black toner instead of so called process black that is produced by mixing cyan, magenta, and yellow toners. For example, a color graphic may contain black lines as a part of the color graphic, and the black lines may be reproduced by the black toner. Such black component is printed as a part of the first pass printing.

Then, the partially printed sheets are loaded into the input paper trays of one or more printers such that each tray is loaded with identical partially printed sheets (step S22). The printers are black and white printers. The input data for the VDP production, including variable data and form data, is loaded into the print shop management server (step S23). Based on how the partially printed sheets are loaded into the input trays, the operator specifies one or more input tray selection rules using the print shop management system software (step S24). The software may implement a graphical user interface (GUI) to allow the operator to specify the tray selection rules. The rules define which input tray to use when printing each piece. The rules may associate input trays with the color form content, such as: "If form content is image #1, use input tray #1". Alternatively, the rule may associate input trays with the variable data, such as: "If age group is group #1, use input tray #1", where the variable data is in turn correlated with the form content by the pre-defined association rules of the VDP production, such as: "If age group is group #1, use image #1".

As an alternative, the input tray selection rules in step S24 may be entered from the printer and the information is transmitted to the server before the production starts. For example, after the operator loads the partially printer sheets into the input trays of a printed, the operator may use the input panel of the printer to enter tray selection information such as: "Tray #1—partially printed sheets for age group #1." The server obtains such information from the printer.

The server creates a print job for each entry in the variable data (i.e. each individual target) (step S25). Each print job includes a job ticket and one or more source files. A job ticket is a file or a database entry that contains a set of print job parameters, such as basic settings (number of copies, orientation of paper, collate, offset printing, original paper size, output paper size, paper type, paper source, etc.), layout settings, cover sheet, finishing settings, inter-sheet settings, tab-paper settings, image quality settings, etc. Job tickets are conventionally used in print shop systems to organize print jobs. The job ticket created in step S25 includes an input tray parameter that defines which input tray to use; the parameter value is automatically set based on the input tray selection rule entered by the operator and the variable or form data for that entry.

In one implementation, the print shop management system software supports a tray name definition feature where each input tray is identified by a tray name. The tray names are stored on the printer as well as in a database on the server. The value of the input tray parameter in each job ticket can be set to the appropriate tray name.

The server generates print data for the print job (step S26). The print data is in a printer language format such as PDL (page description language), or PDF if the printer can handle PDF direct printing, etc. The print data in step S26 is generated based on the variable content and form content for each entry, excluding the color form content that has already been printed on the partially printer sheets. The color form content to be excluded may be determined by an exclusion rule previously defined by the operator. This may be done, for example, at the same time the operator specifies input tray selection rules. For example, the tray selection rule and form content exclusion rule may be: "If form content is image #1, use input tray #1 and exclude image #1 from print data," or "If age group is group #1, use input tray #1 and exclude image #1 from print data." Alternatively, the exclusion rule may specify that all color form contents are to be excluded. When generating the print data in step S26, no print data will be generated for the excluded form content, but spaces are preserved for such contents, and the locations of the other contents are calculated accordingly. Because the software automatically excludes the contents already printed on the partially printed sheets, there is no need to modify the original VDP data to remove such contents.

After generating the job tickets and the print data, the server submits the print jobs to the printer (step S27). In conventional printing methods, the server submits a job to a printer by transmitting print data and the job ticket to the printer. The submitting step S27 here may be implemented in two ways. In the first implementation, for each print job, the server transmits all print data for the print job to the printer. However, in VDP, certain form data is common to all or a subset of all print jobs submitted to each printer. Thus, in the second implementation, the server transmits print data representing form data to the printer only once. The print data is stored on the printer. The print data for each print job refers to certain previously stored print data. Print data generated from the variable data for each job, such as name and address, is transmitted to the printer separately for each print job.

Figure 3:
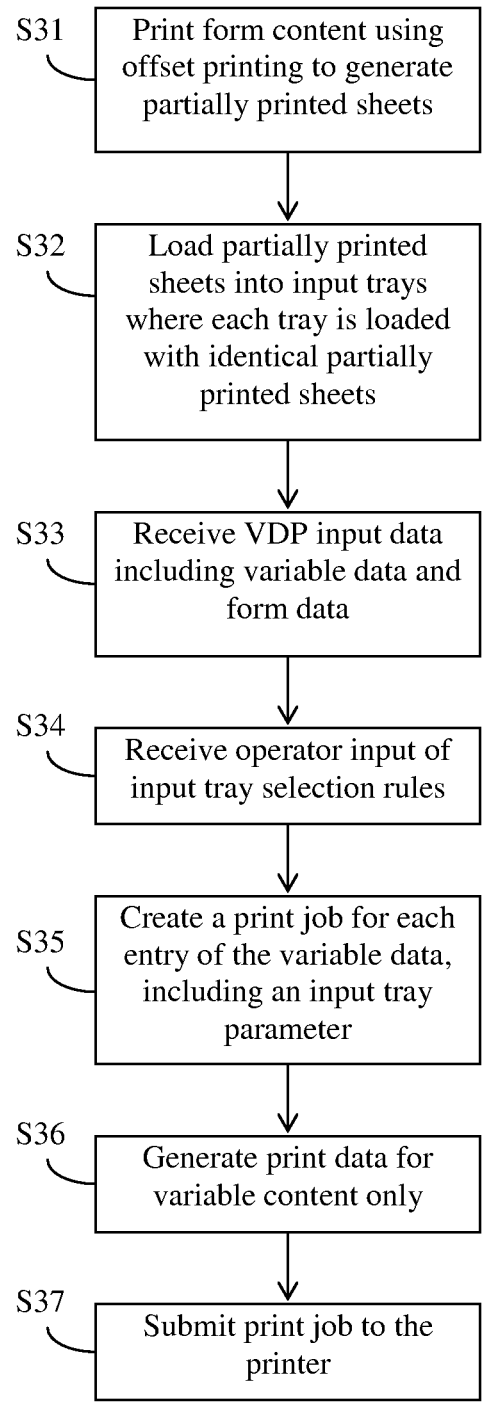
FIG. 3 illustrates a variable data printing method according to another embodiment of the present invention.

FIG. 3 illustrates a VDP printing process according to another embodiment of the present invention, where form content is printed separately from variable content. This method is generally similar to the method shown in FIG. 2 and described above, and steps S31-S37 in FIG. 3 are similar to steps S21-S27 in FIG. 2 except for steps S31 and S36. First, a first pass printing step is performed to print all form contents (both color and black) to generate partially printed sheets (step S21). This step is preferably done by offset printing, and the printer(s) used for this step may be managed by the same print shop management server or a different server. In case where the form data includes only contents of black and white objects, the printer(s) used for the first print pass may be monochrome printer(s), instead of color printer(s). The VDP input data is loaded onto the server. The total number of sheets that will contain a particular form content can be obtained by examining analyzing the variable data entries. Thus, in the first pass printing step, the server analyzes the variable data entries to determine the number of sheets containing each form content, extracts the form content from the VDP data, determines the location of the form content on the sheets (i.e. the location where they should appear in the final printed pieces), and prints the form contents to form partially printer sheets.

Then, the partially printed sheets are loaded into the input paper trays of one or more printers such that each tray is loaded with identical partially printed sheets (step S32). The printers may be monochrome printers depending on the color of variable data. The input data for the VDP production, including variable data and form data, is loaded into the print shop management server (step S33). Based on how the partially printed sheets are loaded into the input trays, the operator specifies one or more input tray selection rules using the print shop management system software (step S34). The software may implement a graphical user interface (GUI) to allow the operator to specify the tray selection rules. The rules define which input tray to use when printing each piece. The rules may associate input trays with the color form content, or associate input trays with the variable data where the variable data is in turn correlated with the form content by the pre-defined association rules of the VDP production. As an alternative, the input tray selection rules in step S34 may be entered from the printer and the information is transmitted to the server before the production starts.

The server creates a print job for each entry in the variable data (i.e. each individual target) (step S35). The job ticket created in step S35 includes an input tray parameter that defines which input tray to use; the parameter value is automatically set based on the input tray selection rule entered by the operator and the variable or form data for that entry. In one implementation, the print shop management system software supports a tray name definition feature where each input tray is identified by a tray name.

The server generates print data for the print job (step S36). The print data in step S36 is generated based on the variable content for each entry, excluding all form content. When generating the print data in step S36, no print data will be generated for the excluded form content, but spaces are preserved for such contents, and the locations of the other contents are calculated accordingly. Because the software automatically excludes the contents already printed on the partially printed sheets, there is no need to modify the original VDP data to remove such contents. After generating the job tickets and the print data, the server submits the print jobs to the printer (step S37).

As mentioned earlier in connection with steps S21 and S31, the printers (offset printers, color later printers, etc.) used for the first pass printing step may be managed by the same print shop management server. In such an arrangement, the operator may load the VDP data and specify a content division rule, as well as the printers to use for each group of contents, before any printing step. For example, the operator may specify that all color form contents are to be printed using a color printer, and the rest of the contents are to be printed using a black and white printer. Or, the operator may specify that all form content (both color and black and white) are to be printed using an offset printer, and the variable contents are to be printed using a black and white laser printer. Then, in carrying our the first pass printing steps S21 and S31, the server automatically selects and prints the contents based on the content division rules; and in steps S26 and S36, the server automatically excludes the already printed contents from the print data.

The embodiments shown in FIGS. 2 and 3 and described above are two examples of how the various contents in a VDP production can be divided so that some contents are printed using a lower cost printer or printing method and other contents are printed using a higher cost printer or printing method. Other ways to divide the contents are also possible. In another embodiment, multiple execution modes are provided, the processes shown in FIGS. 2 and 3 being two of the execution modes, and another mode being a normal mode where a single printer is used to print all the entire VDP production.

Figure 4:
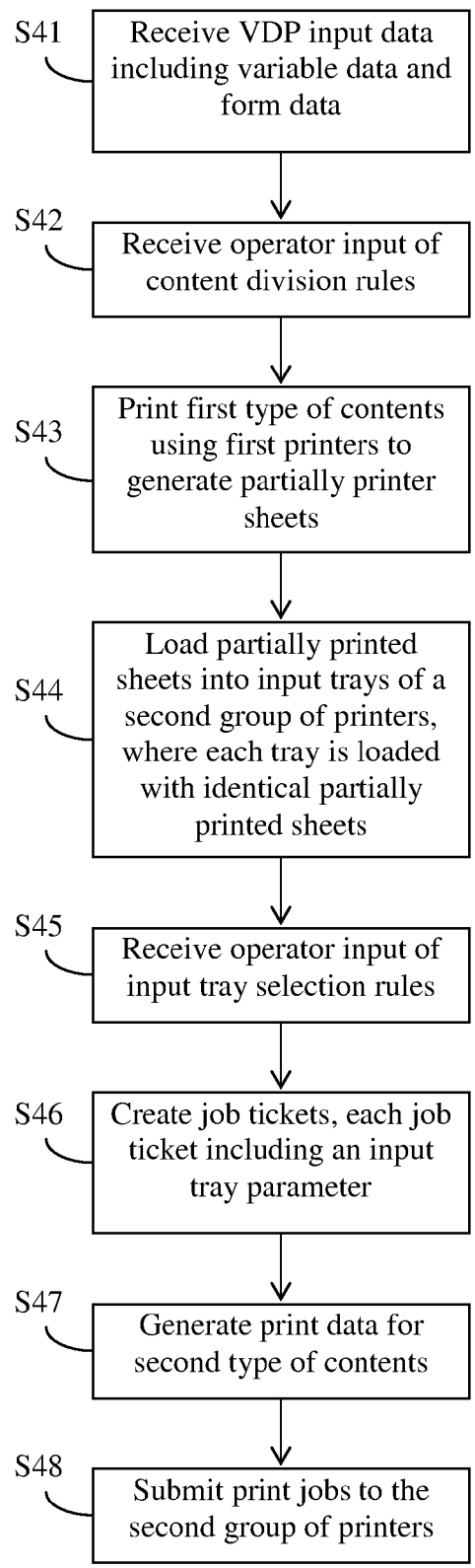
FIG. 4 illustrates a variable data printing method according to another embodiment of the present invention.

More generally, a VDP printing process according to an embodiment of the present invention is shown in FIG. 4. After the input data for the VDP production, including variable data and form data, is loaded into the print shop management server (step S41), the operator inputs a content division rule into the server (step S42). The content division rule divides the contents for each printed piece into two types of contents which will be printed separately on different printers. The two types of contents may be, for example, color content vs. black and white content, form content vs. variable content, etc. The server prints the first type of contents using one or more first printers (e.g. offset printers, color printers, etc.) to generate a plurality of partially printed sheets (step S43). A number of partially printer sheets are printed for each one of the first type of contents, the number being equal to the number of variable data entries associated with that content. Step S43 includes extracting the first type of contents from the VDP input data, as well as analyzing the variable data to determine the numbers of sheets carrying each one of the first type of content.

Then, the operator loads the partially printed sheets into the input paper trays of a second group of printers (e.g. black and white later printers) such that each tray is loaded with identical partially printed sheets (step S44). Based on how the partially printed sheets are loaded in the input trays, the operator inputs input tray selection rules into the server (step S45). The server creates job tickets for the print jobs, preferably one print job for each variable data entry, where the job ticket for each print job includes an input tray parameter that specifies the input tray to be used for that print job (step S46). The input tray parameter value is automatically set based on the input tray selection rules and the variable or form data for that entry. The server also generates print data for each print job, where the print data represents the second type of contents and excludes the first type of contents (step S47). The print jobs are then submitted to the printer for printing (step S48).

Although in the above embodiments (FIGS. 2-4) a single print job is generated for each entry and submitted to a printer, other implementations are possible. For instance, a single print job may be generated for a plurality of entries that will use the same input tray, and each print job is then submitted to a printer where that input tray is installed.

It will be apparent to those skilled in the art that various modification and variations can be made in the variable data printing method and related apparatus of the present invention without departing from the spirit or scope of the invention. Thus, it is intended that the present invention cover modifications and variations that come within the scope of the appended claims and their equivalents.

What is claimed is:

1. A variable data printing method implemented in a print shop management apparatus for generating a plurality of print jobs, the method comprising:
    (a) receiving input data including variable data and form data, the variable data including a plurality of entries each having a plurality of attributes, the attributes of each variable data entry being selected from the group consisting of a target's name, address, demographic information and behavioral history information, the form data including a plurality of types of form data each to be printed in multiple print jobs, the input data further including association rules specifying an association between the attributes of each of the variable data entries and the types of form data to be present in a printed piece for that variable data entry, wherein at least some different attributes of variable data entries are associated with different types of form data, and at least some common attributes of variable data entries are associated with the same types of form data;
    (b) receiving input tray selection rules which specify an association between input trays of one or more first printers and either the types of form data or one or more attributes of the variable data entries;
    (c) generating print data for a plurality of print jobs, each print job corresponding to one variable data entry, wherein the print data for each print job is generated by first determining the types of form data to be present in the printed piece for that variable data entry using the association rules, and then excluding a first type of form data from the determined types of form data using an exclusion rule while keeping a second type of form data, and each print job includes an input tray parameter which is set using the input tray selection rules based on the one or more attributes of the variable data entries or the excluded first type of form data; and
    (d) submitting the print jobs including the print data and the input tray parameters to the one or more first printers.

2. The method of claim 1, wherein the first type of form data is color form data.

3. A variable data printing method implemented in a print shop management apparatus for printing a plurality of printed piece, the method comprising:
    (a) receiving input data including variable data and form data, the variable data including a plurality of entries each having a plurality of attributes, the form data including a plurality of types of form data each to be printed in multiple print jobs, the input data further including association rules specifying an association between the attributes of each of the variable data entries and the types of form data to be present in a printed piece for that variable data entry, wherein at least some different attributes of variable data entries are associated with different types of form data, and at least some common attributes of variable data entries are associated with the same types of form data;
    (b) printing a plurality of partially printed sheets by printing only a first type of form data using one or more first printers;
    (c) receiving input tray selection rules which specify an association between input trays of one or more second printers and either the types of form data or one or more attributes of the variable data entries;
    (d) generating print data for a plurality of print jobs, each print job corresponding to one variable data entry, wherein the print data for each print job is generated by first determining the types of form data to be present in the printed piece for that variable data entry using the association rules, and then excluding the first type of form data from the determined types of form data using an exclusion rule while keeping a second type of form data, and each print job includes an input tray parameter which is set using the input tray selection rules based on the one or more attributes of the variable data entries or the excluded first type of form data;
    (e) loading the plurality of partially printed sheets into the input trays of the second printers corresponding to the input tray parameters, wherein the second printers are different from the first printers; and
    (f) submitting the print jobs including the print data and the input tray parameters to the one or more second printers.

4. The method of claim 1, wherein, in step (c), a job ticket is generated for each print job to include the input tray parameter for the corresponding print job, and
    wherein, in step (e), the print jobs are submitted to the one or more printers together with the job tickets.

5. A computer usable non-transitory medium having a computer readable program code embedded therein for controlling a print shop management apparatus, the computer readable program code configured to cause the print shop management apparatus to execute a variable data printing process for generating a plurality of print jobs, comprising:
    (a) receiving input data including variable data and form data, the variable data including a plurality of entries each having a plurality of attributes, the attributes of each variable data entry being selected from the group consisting of a target's name, address, demographic information and behavioral history information, the form data including a plurality of types of form data each to be printed in multiple print jobs, the input data further including association rules specifying an association between the attributes of each of the variable data entries and the types of form data to be present in a printed piece for that variable data entry, wherein at least some different attributes of variable data entries are associated with different types of form data, and at least some common attributes of variable data entries are associated with the same types of form data;

(b) receiving input tray selection rules which specify an association between input trays of one or more first printers and either the types of form data or one or more attributes of the variable data entries;

(c) generating print data for a plurality of print jobs, each print job corresponding to one variable data entry, wherein the print data for each print job is generated by first determining the types of form data to be present in the printed piece for that variable data entry using the association rules, and then excluding a first type of form data from the determined types of form data using an exclusion rule while keeping a second type of form data, and each print job includes an input tray parameter which is set using the input tray selection rules based on the one or more attributes of the variable data entries or the excluded first type of form data; and (d) submitting the print jobs including the job tickets and the print data to the one or more first printers.

6. The computer usable non-transitory medium of claim 5, wherein the first type of form data is color form data.

7. The computer usable non-transitory medium of claim 5, wherein, in step (c), a job ticket is generated for each print job to include the input tray parameter for the corresponding print job, and wherein, in step (e), the print jobs are submitted to the one or more printers together with the job tickets.

8. A variable data printing method implemented in a print shop management apparatus for managing a plurality of printers for printing a plurality of printed piece, the plurality of printers including one or more first printers and one or more second printers, the method comprising:

(a) receiving input data including variable data and form data, the variable data including a plurality of entries each having a plurality of attributes, the form data including a plurality of types of form data each to be printed on multiple print jobs, the input data further including association rules specifying an association between the attributes of the each of the variable data entries and the types of form data to be present in a printed piece for that variable data entry, wherein at least some different attributes of variable data entries are associated with different types of form data, and at least some common attributes of variable data entries are associated with the same types of form data;

(b) receiving content division rules which divides the variable data and form data into a first type of data and a second type of data;

(c) printing the first type of data using one or more first printers to generate a plurality of partially printed sheets;

(d) receiving input tray selection rules which specify an association between input trays of the one or more second printers and either the types of form data or attributes of the variable data entries;

(e) generating print data for a plurality of print jobs from the second type of data while excluding the first type of data, each print job corresponding to one variable data entry, wherein each job ticket includes an input tray parameter which is set using the input tray selection rules based on the one or more attributes of the variable data entries or the excluded first type of form data;

(f) loading the plurality of partially printed sheets into input trays of the second printers corresponding to the input tray parameters set in step (e);

(g) submitting the print jobs including the print data and the input tray parameters to the second printers for printing.

9. The method of claim 8, wherein the first type of data includes color form data and the second group of content includes all other data.

10. The method of claim 8, wherein the first type of data includes all form data and the second type of data includes variable data.

11. The method of claim 8, wherein the one or more first printers are color printers and the one or more second printers are black and white printers.

12. The method of claim 8, wherein the one or more first printers are offset printers and the one or more second printers are laser printers.

13. The method of claim 8, wherein step (e) includes generating a print job for each variable data entry.

14. The method of claim 8, wherein, in step (e), a job ticket is generated for each print job to include the input tray parameter for the corresponding print job, and wherein, in step (g), the print jobs are submitted to the one or more printers together with the job tickets.

\* \* \* \* \*